United States Patent [19]

Stolzer et al.

[11] Patent Number: 5,353,852
[45] Date of Patent: Oct. 11, 1994

[54] DEPTH OF CUT LOCKING MECHANISM FOR A PLUNGE-TYPE ROUTER

[75] Inventors: J. Timothy Stolzer, Pickens; Ronald C. McCurry, West Union, both of S.C.

[73] Assignee: Ryobi Motor Products Corporation, Easley, S.C.

[21] Appl. No.: 122,390

[22] Filed: Sep. 16, 1993

[51] Int. Cl.5 .............................................. B27C 5/10
[52] U.S. Cl. .......................... 144/134 D; 144/136 C; 409/182
[58] Field of Search .......... 144/134 R, 134 D, 136 R, 144/136 C, 371; 409/181, 182

[56] References Cited

U.S. PATENT DOCUMENTS

| | | | |
|---|---|---|---|
| 2,867,251 | 1/1959 | Moretti et al. | 409/182 |
| 3,908,510 | 9/1975 | Koskolos et al. | 409/182 |
| 4,108,225 | 8/1978 | Hestily | 144/134 D |
| 4,239,428 | 12/1980 | Berzina | 144/136 C |
| 4,319,860 | 3/1982 | Beares | 144/136 C |
| 4,566,830 | 1/1986 | Maier et al. | 409/182 |
| 4,652,191 | 3/1987 | Bernier | 409/182 |
| 4,770,573 | 9/1988 | Monobe | 409/182 |
| 5,143,494 | 9/1992 | McCurry | 409/182 |
| 5,191,921 | 3/1993 | McCurry | 144/134 D |
| 5,273,089 | 12/1993 | Fuchs et al. | 144/136 C |

Primary Examiner—W. Donald Bray
Attorney, Agent, or Firm—Brooks & Kushman

[57] ABSTRACT

A depth of cut lock mechanism for a plunge-type router having a drive motor enclosed within a motor housing. The motor housing is attached to a base plate by a pair of spatially separated guides. Each guide has a guide sleeve attached to the motor housing and a guide tube attached to the base plate and slidably received in the guide sleeve. The lock mechanism has a lock disc rotatable between a lock position and a release position. A torsional spring resiliently biases the disc toward the lock position and a manually activated release lever displaces the lock disc toward the unlocked position. A brass plug is axially displaced by the rotation of the lock disc to frictionally lock the guide sleeve and guide tube to each other. A ratchet mechanism is provided to adjust the torque applied to the lock disc by the torsional spring and a release lever lock mechanism is provided to lock the release lever and lock disc in a release position.

21 Claims, 3 Drawing Sheets

DEPTH OF CUT LOCKING MECHANISM FOR A PLUNGE-TYPE ROUTER

TECHNICAL FIELD

The invention is related to the field of plunge-type routers and, in particular, to a depth of cut locking mechanism locking the location of the router relative to the base plate.

BACKGROUND ART

Plunge-type routers are similar to conventional routers in that they have a drive motor secured within a motor housing. The drive motor has a shaft extending external to the motor housing in a direction toward a base plate attached thereto. A collet or chuck for holding a cutting tool is attached to the external end of the shaft. The motor housing is connected to the base plate by a pair of spatially separated vertical guides.

In conventional types of routers, the motor housing is locked to the vertical guides in a position relative to the base plate such that the cutting tool projects a fixed distance beyond the lower workpiece engaging surface of the base plate at all times. In contrast, plunge-type routers have means for retracting the motor housing so that the cutting tool is above the work engaging surface of the base plate during periods of non-use. In order to enable a plunge-type router to be displaced or "plunged" to the desired cutting depth, adjustable depth stop mechanisms are conventionally provided and may include depth of cut locking mechanisms which lock the position of the router relative to the work engaging surface of the base plate at any desired depth of cut.

Plunge-type routers typically include a pair of handles by means of which the operator may hold and guide the router during use. These handles are also used when the operator "plunges" the router to its desired depth of cut. Once the router is displaced to its desired depth of cut, the motor housing is locked to the vertical guides providing a fixed relationship between the router and the work engaging surface of the base plate. This permits the operator to concentrate on guiding the router without having to worry about the depth of cut.

The invention is a depth of cut locking mechanism for a plunge-type router having a normally locked state which is manually releasable.

SUMMARY OF THE INVENTION

The invention is a depth of cut locking mechanism for locking the position of a plunge-type router relative to a base plate. The router has a motor housing connected to the base plate by a pair of spatially separated telescoping guides. Each of the telescoping guides has a guide sleeve fixedly disposed in the motor housing and a guide tube attached to the base plate. The guide tube is slidably disposed in the guide sleeve.

The depth of cut locking mechanism consists of a release lever pivotably attached to the motor housing which is manually displaceable from a lock position to a release position and a mounting bracket securing the guide sleeve to the motor housing. The mounting bracket has a threaded aperture normal to the axis of the guide sleeve. A lock disc has a threaded boss threadably received in the threaded aperture of the mounting bracket. The lock disc is rotatable about an axis concentric with the threaded boss and is rotatable between a lock position and a release position. The lock disc is axially displaced by the threads on the threaded boss toward the guide sleeve when the lock disc is rotated toward the lock position and axially displaced away from the guide sleeve when the lock disc is rotated toward the release position. Biasing means are provided for producing a torque urging the lock disc toward the lock position and connector means are provided to rotate the lock disc toward the release position in response to the displacement of the release lever toward its release position. Means are further provided for frictionally locking the guide tube to the guide sleeve in response to the axial displacement of the lock disc when it is rotated toward the lock position by the biasing means.

The depth of cut locking mechanism may also include means for manually adjusting the torque applied to the lock disc by the biasing means and for manually locking the release lever in the release position.

The advantage of the depth of cut locking mechanism is that it has a normal locked state and is manually activated to a released state.

Another advantage of the locking mechanism is that the force which locks the position of the motor housing relative to the base plate is adjustable.

Still another advantage of the locking mechanism is that the location of the element that engages the guide tube to frictionally lock the guide sleeve and the guide tube to each is adjustable to compensate for wear.

Yet another advantage is that the locking mechanism may be locked in the released state.

These and other advantages will become more apparent from a reading of the detailed description of the invention in conjunction with the drawings.

DETAILED DESCRIPTION OF THE INVENTION

Figure 1:
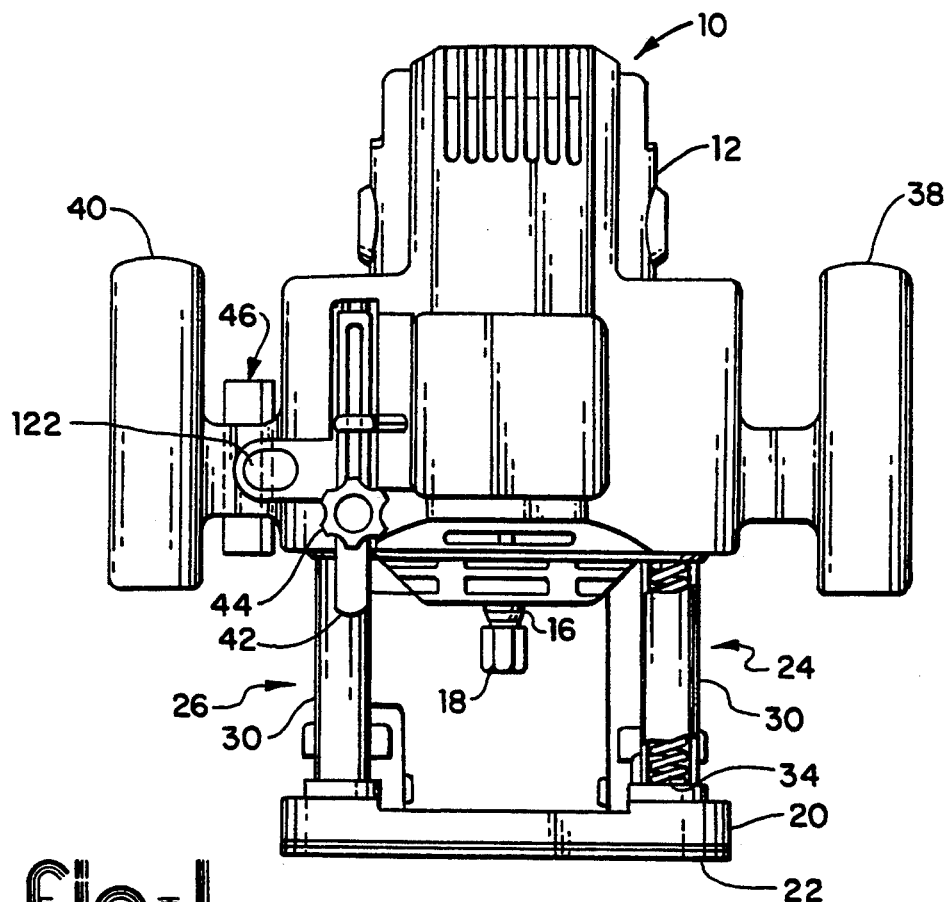
FIG. 1 is a front view of the plunge-type router.
Figure 2:
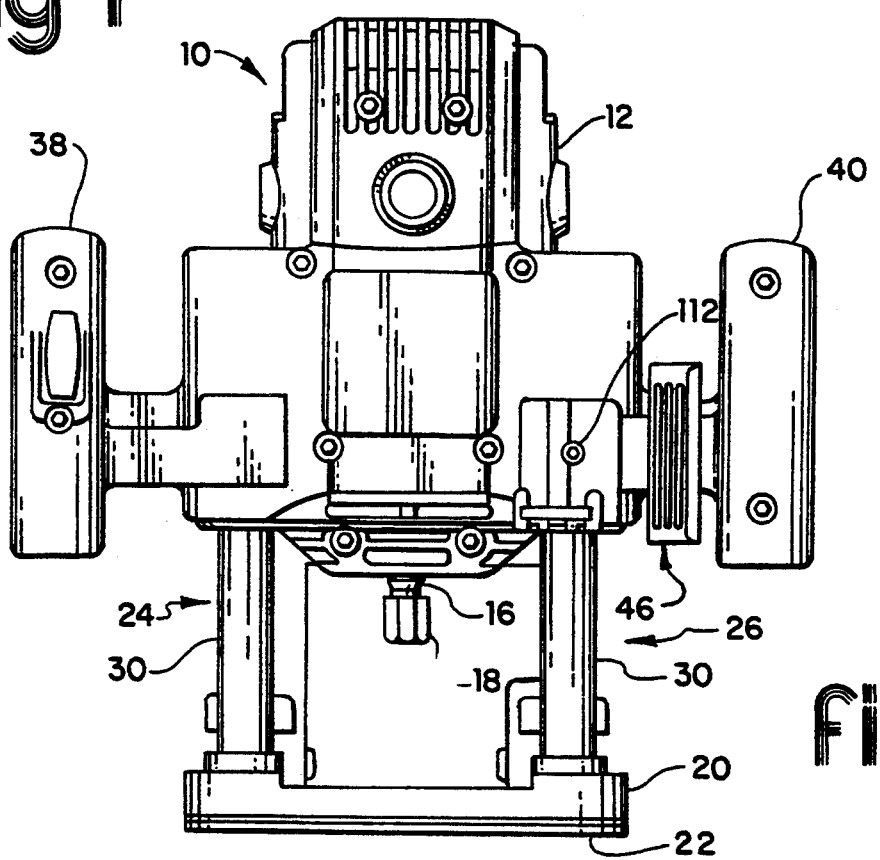
FIG. 2 is a rear view of the plunge-type router.

A plunge-type router 10 incorporating an arrangement according to the invention is shown in FIGS. 1 and 2. The router 10 has a motor housing 12 which houses a drive motor 14 as shown in the cross-sectional view of FIG. 3. The drive motor 14 has a shaft 16 which extends external to the motor housing 12 at a lower end thereof. A collet or chuck 18, adapted to hold a cutting tool, is attached to the distal end of the shaft 16 as shown.

A base plate 20 having a work engaging surface 22 is connected to the motor housing 12 by a pair of telescoping guides 24 and 26. Each of the telescoping guides 24 and 26 consist of a guide sleeve 28 disposed inside the router housing 12 on opposite sides of the drive motor 14 and a guide tube 30 attached to said base plate 20. The guide tube 30 is slidably received in the guide sleeve 28 as more clearly shown in FIG. 3. The guide tubes 30 are disposed normal to the work engaging surface 22 of the base plate 20 and guide the displacement of the router 10 normal to the work engaging surface 22. The telescoping guides 24 and 26 maintain the orientation of the router 10 relative to the base plate 20 and allow the router 10 to be displaced relative thereto.

Figure 3:
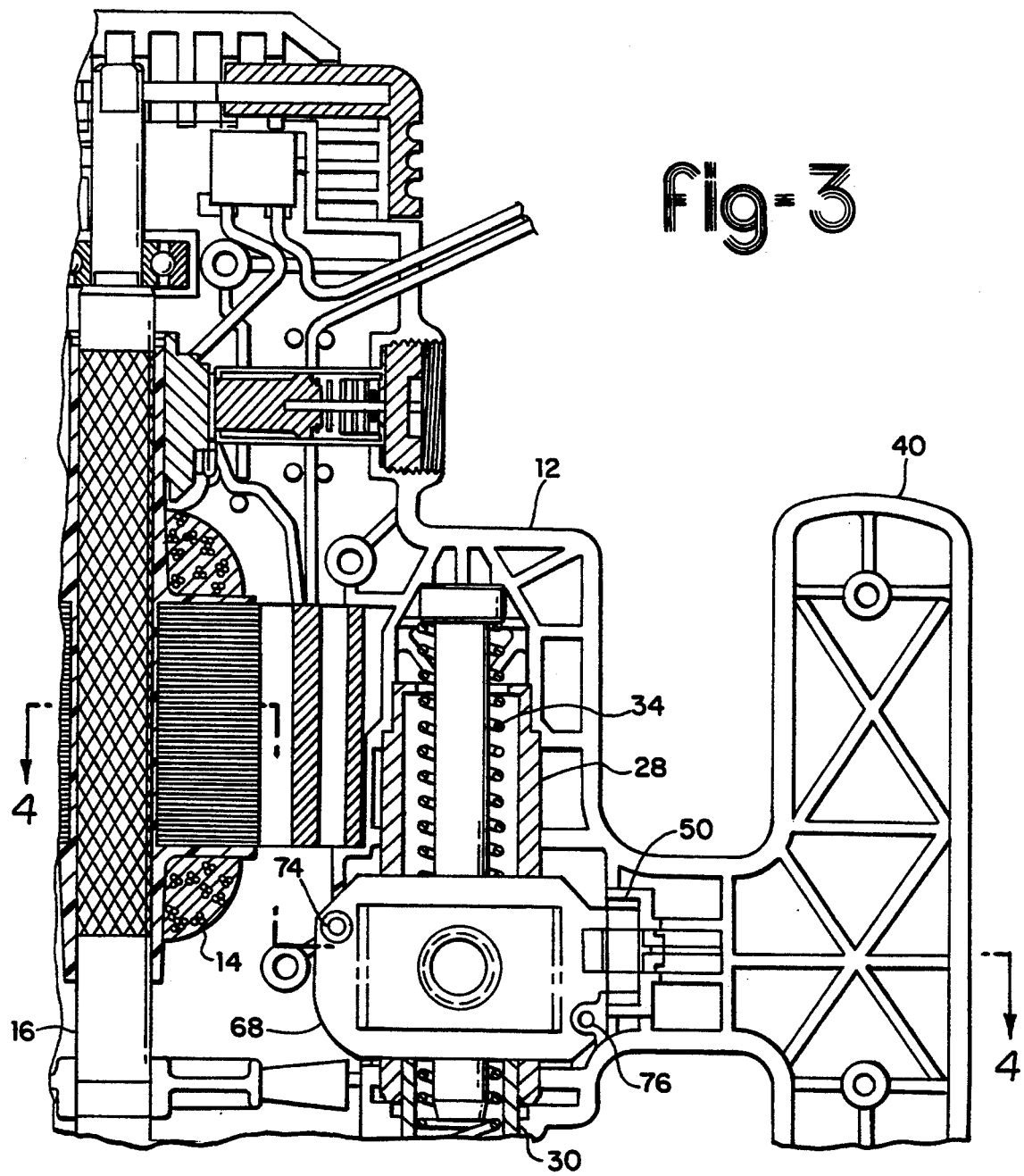
FIG. 3 is a partial cross-sectional view of the motor housing 12.

A coil spring 34, as shown in FIGS. 1 and 3, is disposed within the telescoping guides 24 and 26 and resiliently biases the router 10 away from the base plate 20 with a force sufficient to counterbalance the gravitational forces acting on the router 10 when the telescoping guides 24 and 26 are vertically disposed.

When using a plunge router of the type shown in FIGS. 1 and 2, the operator places the work engaging surface 22 of the base plate 20 on a surface of a workpiece. The operator grasps the handles 38 and 40, which are integral with the motor housing 12, and displaces the router 10 toward the workpiece against the force of the coil springs 34 until the cutting tool attached to collet 18 is at the desired location relative to the workpiece. A movable stop bar 42 may be attached to the motor housing 12 to preset the location of the cutting tool relative to the workpiece. The stop bar 42 may be locked in place by a clamp 44.

Once the motor housing 12 and the cutting tool have been displaced to the desired location, it is desirable to lock the motor housing 12 to the telescoping guides 24 and 26. According to this invention, there is provided a depth of cut locking mechanism for locking the motor housing 12 to the telescoping guide 26 at the desired location, or any other location within the limits of the telescoping guides 24 and 26.

Figure 4:
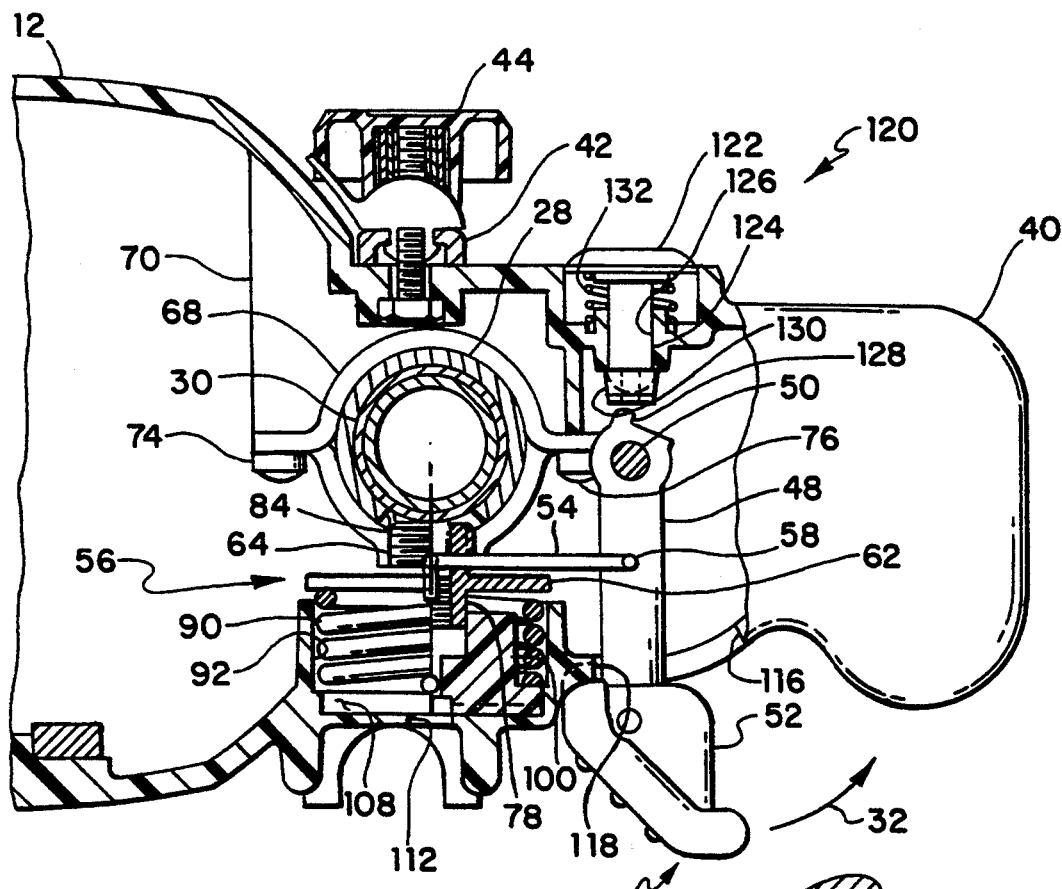
FIG. 4 is a partial cross-sectional view taken along lines 4—4 shown in FIG. 3.

Referring now to FIG. 4, the depth of cut locking mechanism consists of a release lever 46 pivotably mounted to the motor housing 12. The release lever 46 has an internal portion 48 which is pivotably connected to a pivot pin 50 and an external portion 52 extending through a slot provided in the motor housing 12 and is accessible to the operator when he grasps the handle 40. An actuator rod 54 connects the internal portion 48 of the release lever 46 to a lock disc 56. One end of the actuator rod 54 has a first tang received in an appropriate aperture 58 provided in the internal portion 48 of the release lever 46 and the other end of the actuator rod 54 has a second tang received in an appropriate aperture 60 provided through a disc portion 62 of the lock disc 56.

Figure 5:
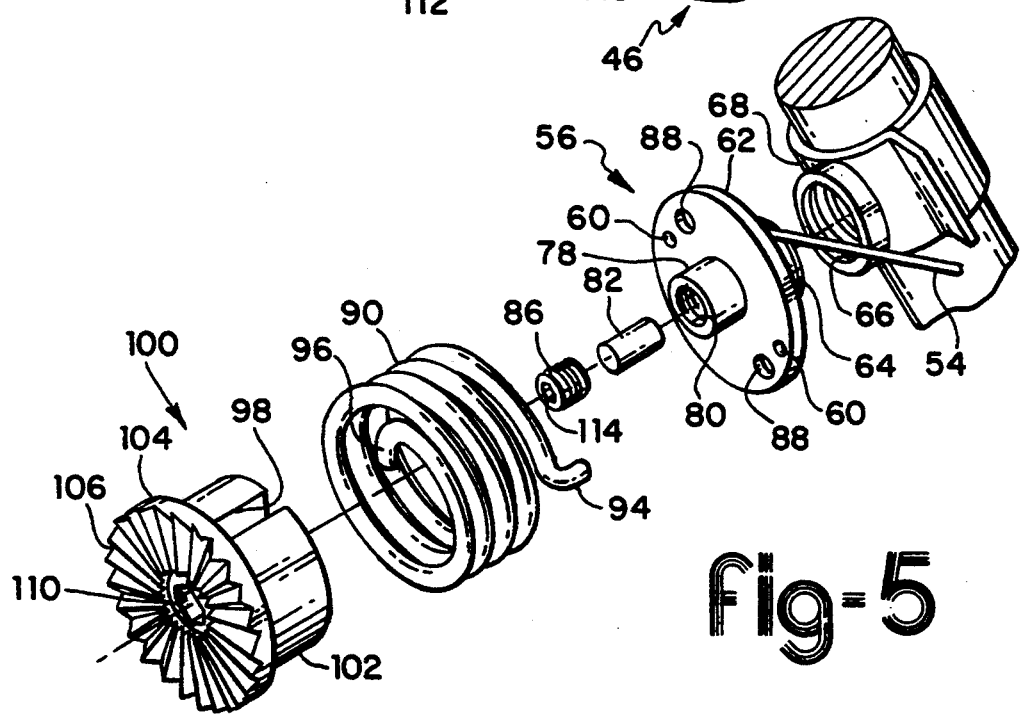
FIG. 5 is an exploded perspective view showing the individual elements of the locking mechanism internal to the motor housing.

In the preferred embodiment, the disc portion 62 of the lock disc 56 has at least two (2) diametrically opposed apertures 60, as shown in FIG. 5. The lock disc 56 has a left hand threaded boss 64, which is threadably received in a threaded aperture 66 provided in sleeve clamp 68. The sleeve clamp 68 secures the guide sleeve 28 in the motor housing 12. The sleeve clamp 68 is secured to an internal boss 70 provided in the motor housing 12 by threaded fasteners, such as bolts 74 and 76.

The lock disc 56 also has a spring guide boss 78 provided on the side of the disc portion 62 opposite the threaded boss 64 and a bore 80 provided therethrough concentric with the spring guide and threaded bosses 78 and 64, respectively. The bore 80 is threaded at least part way therethrough as shown in FIG. 5. A brass plug 82 is slidably received in the bore 80 and passes through a concentric clearance aperture 84 provided in the sleeve guide 28 to engage the guide tube 30. A set screw 86 is threadably received in the threaded bore 80 to urge the brass plug 82 into locking engagement with the guide tube 30 when the release lever 46 is resiliently biased to the position shown in FIG. 4 as shall be explained hereinafter.

The disc portion 62 of the lock disc 56 also has at least one spring tang bore 88. Preferably, the disc portion 62 has two diametrically opposed spring tang bores 88, as shown in FIG. 5. A torsional spring 90 is disposed in a well 92 provided in the motor housing 12. The torque spring 90 has a first tang 94 provided at one end thereof which extends in an axial direction and is receivable in one of the spring tang bores 88 of the lock disc 56. A second tang 96 is disposed in an inward radial direction and is received in a slot 98 in a ratchet member 100 disposed at the bottom of the well 92. The ratchet member 100 has a cylindrical spring guide portion 102 in which is formed a slot 98 and a ratchet portion 104 having a series of radially extending unidirectional ratchet teeth 106 which engage a mating set of unidirectional ratchet teeth 108 provided at the bottom of well 92. The torsional spring 90 also provides a resilient axial force urging the ratchet teeth 106 of the ratchet member 100 into locking engagement with the ratchet teeth 108 at the bottom of the well 92.

The ratchet member 100 has an axially disposed hexagonally-shaped through bore 110 sized to receive a standard size hexagonal wrench such as a standard size Allen wrench. The motor housing 12 has a coaxially aligned aperture 112 which permits the Allen wrench to be inserted into the hexagonally-shaped through bore 110 from outside the motor housing 12. The set screw 86 also has a hexagonally-shaped bore 114 adapted to receive a smaller Allen wrench. The hexagonally-shaped bore 114 is smaller than hexagonally-shaped bore 110 and is axially aligned with and can rotate within the hexagonally-shaped bore 110 so that the smaller Allen wrench can be inserted into hexagonally-shaped bore 114 through the aperture 112 provided in the motor housing 12 and the hexagonally-shaped through bore 110.

In the adjustment of the locking mechanism, the location of the brass plug 82 is adjusted by rotating set screw 86 so that when the lock disc 56 is rotated to its unlocked position by the displacement of the release lever 46 in a counter-clockwise direction indicated by arrow 32 as shown in FIG. 4 to an unlocked position adjacent to the end 116 of the slot provided in the motor housing 12, the brass plug 82 will be disengaged from the guide tube 30. When the lock disc 56 is rotated in a clockwise direction to its lock position by the torsional spring 90, the brass plug will forcibly engage the guide tube 30 frictionally locking the guide tube 30 within the guide sleeve 28 and the release lever 46 will be returned to the other end 118 of the slot.

The rotation of the ratchet member 110 in a counter-clockwise direction by an Allen wrench inserted into hexagonally-shaped through bore 110 will increase the resilient torque exerted by torsional spring 90 on the lock disc 56 urging the lock disc 56 in a counterclockwise direction toward its locked position and urging the release lever 46 in a clockwise direction toward mechanical stop 118. Because the threads on the threaded boss 64 are left-handed threads, the counterclockwise rotation of the lock disc 56 will physically displace the lock disc 56 and the brass plug 82 toward the guide tube 30. With the lock disc in its locked position, the ratchet member 100 is rotated in a counter-clockwise direction until the torque exerted by torsional spring 90 on the lock disc 56 is sufficient to produce an axial force on the brass plug 82 to frictionally lock the guide tube 30 to the guide sleeve 28.

The manual displacement of the release lever in a counter-clockwise direction, as shown by arrow 32 in FIG. 4, will rotate the stop disc 56 in a clockwise direction against the force of torsional spring 90, retracting the lock disc 56 and the brass plug away from the guide tube 30 permitting the guide tube 30 to be freely displaced relative to guide sleeve 28. This permits the router 10 to be freely displaced relative to the base plate 20. Upon releasing the release handle 46, the torque generated by the torsional spring 90 will urge the lock disc 56 to its locked position and displace the release handle 46 in a clockwise direction toward its locked position adjacent to mechanical stop 118.

In the adjustment of the location of the brass plug 82 by set screw 86, it is preferred that when the stop disc is rotated to its lock position by the torque provided by torsional spring 90, the release handle 46 is displaced a small distance from the mechanical stop 118. This arrangement permits the full torque provided by coil spring 90 to be applied to the stop disc 56 urging its counter-clockwise rotation. In turn, this full torque is translated into an axial force on brass plug 82 frictionally locking the guide tube 30 in the guide sleeve 28.

A release lever locking mechanism 120 is also provided to lock the release lever 46 in the unlocked position. The release lever locking mechanism 120 consists of a spring-loaded button 122 provided on the side of the motor housing 12 opposite the release lever 46. The spring-loaded button 122 has a shaft 124 which extends into the motor housing 12 through an aperture 126 to a location adjacent to the end of the internal portion 48 of the release lever 46. A dog 128 is provided on the end of the internal portion 48 of the release lever 46 which is engageable by a dog catch 130 provided on the end of the shaft 124 when the release handle 46 is displaced counter-clockwise to the released position and the button 122 is depressed. Releasing the release lever 46 from the release position with the button 122 depressed will frictionally engage the dog catch 130 with the dog 128 holding the button in the depressed position. A subsequent displacement of the release lever 48 in a counter-clockwise direction will disengage the dog catch 130 from the dog 128 permitting the spring 132 to return the button 122 to its undepressed location. The release lever 46 then may be fully displaced clockwise to its lock position.

Having described a preferred embodiment of the locking mechanism with reference to the drawings, it is understood that those skilled in the art may make certain changes and improvements within the scope of the appended claims.

What is claimed is:

1. A depth of cut locking mechanism for a plunge-type router which locks the position of a router relative to a base plate, the router having a motor housing connected to the base plate by a pair of spatially separated telescoping guides, each of the telescoping guides having a guide sleeve fixedly disposed in the motor housing and a guide tube attached to the base plate, the guide tube is slidably received in the guide sleeve, said locking mechanism comprising:
   a release lever pivotably connected to the motor housing, said release lever displaceable between a lock position and a release position;
   a mounting bracket securing said guide sleeve in said motor housing, said mounting bracket having a threaded aperture provided therethrough normal to the guide sleeve;
   a lock disc having a threaded boss threadably received in said threaded aperture, said lock disc rotatable about an axis concentric with said threaded boss between a lock position and a release position, said lock disc being axially displaced toward said guide sleeve when rotated from said release position toward said lock position and axially displaced away from said guide sleeve when said lock disc is rotated from said lock position toward said release position;
   biasing means for producing a torque urging said lock disc to rotate toward said lock position;
   connector means for pivotably connecting said lock disc to said release lever to rotate said lock disc from said locked position to said release position against the torque produced by said biasing means in response to a manual displacement of said release lever from said lock position to said release position; and
   means for frictionally locking said guide tube in said guide sleeve in response to said axial displacement of said lock disc when said lock disc is rotated to said locked position.

2. The locking mechanism of claim 1 further comprising an operator actuated release lever locking means for inhibiting the displacement of said release lever from said release position to said lock position to permit said router to be freely displaced along said pair of spatially separated telescoping guides relative to said base plate.

3. The locking mechanism of claim 1 wherein said biasing means comprises a torsional spring providing said torque to said lock disc, said torsional spring having a stationary end connected to said motor housing and a free end connected to said lock disc.

4. The locking mechanism of claim 3 further comprising torque adjustment means connected between said stationary end of said torsional spring and said motor housing for adjusting torque provided by said torsional spring urging said lock disc toward said lock position.

5. The locking mechanism of claim 4 wherein said torque adjustment means comprises:
   a well provided in said motor housing, said well having a first set of radially disposed ratchet teeth provided in a bottom thereof;
   a ratchet member connected to said stationary end of said torsional spring, said ratchet member disposed in said well and having a second set of radially disposed ratchet teeth engaging said first set of radially disposed ratchet teeth to inhibit the rotation of said ratchet member relative to said motor housing; and
   means for facilitating the rotation of said ratchet member relative to said motor housing to ratchet said second set of radially disposed ratchet teeth relative to said first set of radially disposed ratchet teeth to adjust the torque applied to said lock disc by said coil spring.

6. The locking mechanism of claim 5 wherein said means for facilitating is an axially disposed hexagonally-shaped bore provided through said ratchet member adapted to receive a standard size hexagonal wrench through a bore provided through said bottom of said well.

7. The locking mechanism of claim 5 wherein said stationary end of said torsional spring has an inwardly directed tang and wherein said ratchet member has a cylindrical portion circumscribed by said torsional spring, said cylindrical portion having a diametrically disposed slot therein receiving said inwardly directed tang.

8. The locking mechanism of claim 1 wherein said connector means is a connector rod having one end pivotably connected to said release lever and an opposite end pivotably connected to said lock disc at a location offset from said axis.

9. The locking mechanism of claim 1 wherein said means for frictionally locking comprises:
an aperture provided through said lock disc concentric with said axis, said aperture having a threaded portion;
a cylindrical plug slidably received in said aperture engageable with said guide tube through an aperture provided through said guide sleeve; and
a set screw threadably received in said threaded portion of said aperture to adjust the location of said cylindrical plug so that said cylindrical plug forcibly engages said guide tube to frictionally lock said guide tube to said guide sleeve when said lock disc is rotated to said lock position by said torsional spring and is disengaged from said guide tube when said lock disc is rotated to said release position by said release lever.

10. The locking mechanism of claim 2 wherein said release lever locking means comprises:
a dog provided on said release lever; and
a spring loaded push button having a normal unlocked position and a depressed position, said spring loaded push button having a dog catch engageable with said dog when said release lever is in said release position and said push button is in said depressed position, the engagement of said dog catch with said dog inhibiting said release lever from returning to said lock position by said biasing means.

11. A plunge-type router comprising:
a motor housing enclosing a drive motor, said drive motor having a shaft extending external to said motor housing and adapted to have a cutting tool secured;
a base plate;
a pair of spatially separated telescoping guides, each of said telescoping guides of said pair of telescoping guides having a guide sleeve fixedly disposed in said motor housing and a guide tube attached to said base plate, each of said guide tubes being slidably received in its associated guide sleeve;
a release lever pivotably connected to said motor housing, said release lever displaceable between a lock position and a release position;
at least one mounting bracket securing a selected one of said guide sleeves in said housing, said at least one mounting bracket having a threaded bore provided therethrough normal to an axis of said guide sleeve;
a lock disc having an axially disposed threaded boss threadably received in said threaded bore, said lock disc rotatable about an axis concentric with said threaded boss between a lock position and a release position, said threaded boss axially displacing said lock disc toward said guide sleeve when said lock disc is rotated in a direction toward said lock position and axially displacing said lock disc away from said guide sleeve when said lock disc is rotated in a direction toward said release portion;
biasing means for producing a torque urging said lock disc to rotate in a direction toward said lock position;
connector means for connecting said release lever to said lock disc to rotate said sector disc toward said release position in response to a manual displacement of said release lever from said lock position toward said release position; and
means for frictionally locking said guide tube and said guide sleeve to each other in response to said lock disc being displaced to said lock position by said biasing means.

12. The plunge-type router of claim 11 further comprising an operator actuated release lever locking means for inhibiting the displacement of said release lever from said release position toward said lock position.

13. The plunge-type router of claim 11 wherein said biasing means comprises a torsional spring providing said torque to said lock disc, said torsional spring having a stationary end connected to said motor housing and a free end connected to said lock disc.

14. The plunge-type router of claim 13 wherein said biasing means further comprises torque adjustment means connected to said stationary end of said torsional spring for adjusting said torque provided by said torsional spring to said lock disc.

15. The plunge-type router of claim 14 wherein said torque adjustment means comprises:
a spring well provided in said motor housing, said spring well having a first set of ratchet teeth radially disposed in a bottom of said spring well;
a ratchet member connected to said stationary end of said torsional spring, said ratchet member disposed in said spring well and having a second set of ratchet teeth engaging said first set of ratchet teeth, said engagement of said first and second set of ratchet teeth inhibiting the rotation of said ratchet member relative to said motor housing; and
means for facilitating the rotation of said ratchet member relative to said motor housing to ratchet said second set of ratchet teeth relative to said first set of ratchet teeth to adjust said torque applied to said lock disc to have a value sufficient to frictionally lock said guide sleeve and said guide tube to each other.

16. The plunge-type router of claim 15 wherein said means for facilitating is an axially disposed hexagonal through bore adapted to receive a hexagonal wrench through an axially aligned aperture provided through said bottom of said spring well.

17. The plunge-type router of claim 15 wherein said stationary end of said torsional spring has a radially disposed inwardly directed tang, said ratchet member has a cylindrical spring guide portion having a diametrically disposed slot receiving said inwardly directed tang.

18. The plunge-type router of claim 11 wherein said connector means is a connector rod having one end pivotably connected to said release lever and an opposite end pivotably connected to said lock disc at a location on said lock disc offset from said axis.

19. The plunge-type router of claim 11 wherein said means for frictionally locking comprises:
an axially disposed bore provided through said lock disc, said bore having a threaded portion;
a plug slidably disposed in said bore, said plug engageable with said guide tube through an aperture provided through said guide sleeve; and a set screw threadably received in said threaded portion to adjust the location of said plug so that said plug forcibly engages said guide tube frictionally locking said guide tube and said guide sleeve to each other when said lock disc is rotated to said lock position by said biasing means and is released from said guide tube when said lock disc is rotated to said release position.

20. The plunge-type router of claim 19 wherein said plug is a cylindrical brass plug.

21. The locking mechanism of claim 2 wherein said release lever has an internal portion disposed inside said motor housing and an external portion external to said motor housing, said release lever locking means comprises:

a dog provided on said internal portion of said release lever; and a spring loaded push button having a normal unlocked state and a depressed state, said push button having a dog catch engageable with said dog when said release lever is in said release position and said push button is in said depressed state, the engagement of said dog with said dog catch inhibiting the displacement of said release lever to said lock position.

* * * * *